United States Patent
Arimilli et al.

(10) Patent No.: US 7,523,260 B2
(45) Date of Patent: Apr. 21, 2009

(54) PROPAGATING DATA USING MIRRORED LOCK CACHES

(75) Inventors: Ravi K. Arimilli, Austin, TX (US); Rama K. Govindaraju, Hopewell Junction, NY (US); Peter H. Hochschild, New York, NY (US); Bruce G. Mealey, Austin, TX (US); Satya P. Sharma, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 11/315,465

(22) Filed: Dec. 22, 2005

(65) Prior Publication Data

US 2007/0150665 A1 Jun. 28, 2007

(51) Int. Cl.
*G06F 12/00* (2006.01)
(52) U.S. Cl. .................. 711/124; 711/145; 711/163; 711/206
(58) Field of Classification Search .......... 711/124, 711/163, 145, 206
See application file for complete search history.

(56) References Cited

U.S. PATENT DOCUMENTS

| | | | | |
|---|---|---|---|---|
| 5,142,676 | A | * | 8/1992 | Fried et al. .................. 711/152 |
| 5,678,020 | A | | 10/1997 | Singh et al. |
| 5,832,534 | A | | 11/1998 | Singh et al. |
| 5,893,156 | A | * | 4/1999 | Matsumoto ................. 711/145 |
| 5,903,908 | A | | 5/1999 | Singh et al. |
| 6,202,125 | B1 | | 3/2001 | Patterson et al. |
| 6,230,230 | B1 | * | 5/2001 | Joy et al. .................... 710/200 |
| 6,615,340 | B1 | * | 9/2003 | Wilmot, II .................. 712/209 |
| 6,839,816 | B2 | | 1/2005 | Borkenhagen et al. |
| 2002/0112120 | A1 | | 8/2002 | Franz et al. |

FOREIGN PATENT DOCUMENTS

WO WO89/09442 10/1989

OTHER PUBLICATIONS

Hennessy and Patterson, Computer Organization and Design, second edition, Morgan Kaufman, 1998, pp. 717-726.*
IBM Technical Disclosure Bulletin NN74033471, Communication Protocol for Deadlock Detection in Computer Networks. Mar. 1974.*

(Continued)

*Primary Examiner*—Matt Kim
*Assistant Examiner*—John P Fishburn
(74) *Attorney, Agent, or Firm*—Kevin M. Jordan; Jon A. Gibbons; Fleit Gibbons Gutman Bongini & Bianco P.L.

(57) ABSTRACT

A method, processing node, and computer readable medium for propagating data using mirrored lock caches are disclosed. The method includes coupling a first mirrored lock cache associated with a first processing node to a bus that is communicatively coupled to at least a second mirrored lock cache associated with a second processing node in a multi-processing system. The method further includes receiving, by the first mirrored lock cache, data from a processing node. The data is then mirrored automatically so that the same data is available locally at the second mirrored lock cache for use by the second processing node.

1 Claim, 7 Drawing Sheets

OTHER PUBLICATIONS

Jovanovic, M., and Milutinovic, V., "An Overview of Reflective Memory Systems," IEEE Concurrency, Apr.-Jun. 1999.*

"Reservation Structure to Support Atomic Memory Accesses at the Memory Directory Maintaining Transparency to Memory for Shared Caches when Executing Atomic Instruction in MP Systems," IBM Technical Disclosure Bulletin, Jul. 1994, pp. 663-634.

Jovanovic, et al., "An Overview of Reflective Memory Systems," IEEE, Concurrency, Apr.-Jun. 1999, vol. 7, Issue 2.

* cited by examiner

PROPAGATING DATA USING MIRRORED LOCK CACHES

FIELD OF THE INVENTION

The present invention generally relates to the field of information processing systems, and more particularly relates to cache memory in an information processing system.

BACKGROUND OF THE INVENTION

Many computing environments today utilize multiple processors. For example, a symmetric multiprocessing ("SMP") environment is one type of computing environment commonly used today. An SMP environment includes two or more processors that are connected to a shared main memory. All of the processors are generally identical, insofar as the processors all utilize common instruction sets and communication protocols, have similar hardware architectures, and are generally provided with similar memory hierarchies.

These processors often contain a small amount of dedicated memory, known as a cache. Caches are used to increase the speed of operation. In a processor having a cache, as information is called from main memory and used, it is also stored, along with its address, in a small portion of especially fast memory, usually in static random access memory (SRAM). As each new read or write command is issued, the system looks to the fast SRAM (cache) to see if the information exists. A comparison of the desired address and the addresses in the cache memory is made. If an address in the cache memory matches the address sought, then there is a hit (i.e., the information is available in the cache). The information is then accessed in the cache so that access to main memory is not required. Thereby, the command is processed much more rapidly. If the information is not available in the cache, the new data is copied from the main memory and stored in the cache for future use.

Critical sections of cache are sometimes locked to protect the data. Locking of critical sections is a pervasive and performance critical operation in Operating Systems, middleware and end user applications. Locks usually are a software convention that gives one entity such as a processor, process, program, program thread, or the like access to a data structure or to a code sequence. Once the locking entity owns or has the lock no other entity has access to the lock. The standard mechanisms for locking involve using shared variables, access to which is protected by architecturally enabled atomic instructions. The shared variables need to be accessible efficiently from all processors in an SMP. As stated above, each processor typically has its own cache. Multiple processors may potentially try to access the same lock at the same time resulting in potential "hot spotting" of locks.

These locks are called global locks since each processor has an equal chance of acquiring the lock as compared to a local lock, which a single processor is usually the only one that access the lock. Such hot spotting causes the cache line containing the lock word to inefficiently and frequently migrate between processor caches. This migration impairs the efficiency of lock operations. Once a process (running on a processor) acquires a lock, ownership must be made visible to other processors on the SMP; this is typically accomplished via a synchronization instruction. The broadcast or the sync instruction are typically quite expensive and do not scale efficiently with the size of the SMP.

Therefore a need exists to overcome the problems with the prior art as discussed above.

SUMMARY OF THE INVENTION

Briefly, in accordance with the present invention, disclosed are a method, processing node, and computer readable medium for propagating data using mirrored lock caches. The method includes coupling a first mirrored lock cache associated with a first processing node to a bus that is communicatively coupled to at least a second mirrored lock cache associated with a second processing node in a multi-processing system. The method further includes receiving, by the first mirrored lock cache, data from a processing node. The data is then mirrored automatically so that the same data is available locally at the second mirrored lock cache for use by the second processing node.

In another embodiment of the present invention, a processing node is disclosed. The processing node includes at least one mirrored lock cache and a communication bus. The communication bus is for communicatively coupling at least one mirrored lock cache to at least one other mirrored lock cache in at least one node of a multi-processing system. Each mirrored lock cache automatically mirrors resident data so that the same data is available locally at each other mirrored lock cache.

In yet another embodiment, a computer readable medium for propagating data using mirrored lock caches is disclosed. The computer readable medium includes instructions for coupling a first mirrored lock cache associated with a first processing node to a bus that is communicatively coupled to at least a second mirrored lock cache associated with a second processing node in a multi-processing system. The computer readable medium further includes instructions for receiving, by the first mirrored lock cache, data from a processing node. The data is then mirrored automatically so that the same data is available locally at the second mirrored lock cache for use by the second processing node.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable storage medium allowing a computer to read data, instructions, messages or message packets, and other computer readable information from the computer readable storage medium. The computer readable storage medium may include non-volatile memory, such as ROM, Flash memory, floppy disk, Disk drive memory, CD-ROM, and other permanent storage. Additionally, a computer readable storage medium may include, for example, volatile storage such as RAM, buffers, and cache memory.

The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary Multi-Computer System

Figure 1:
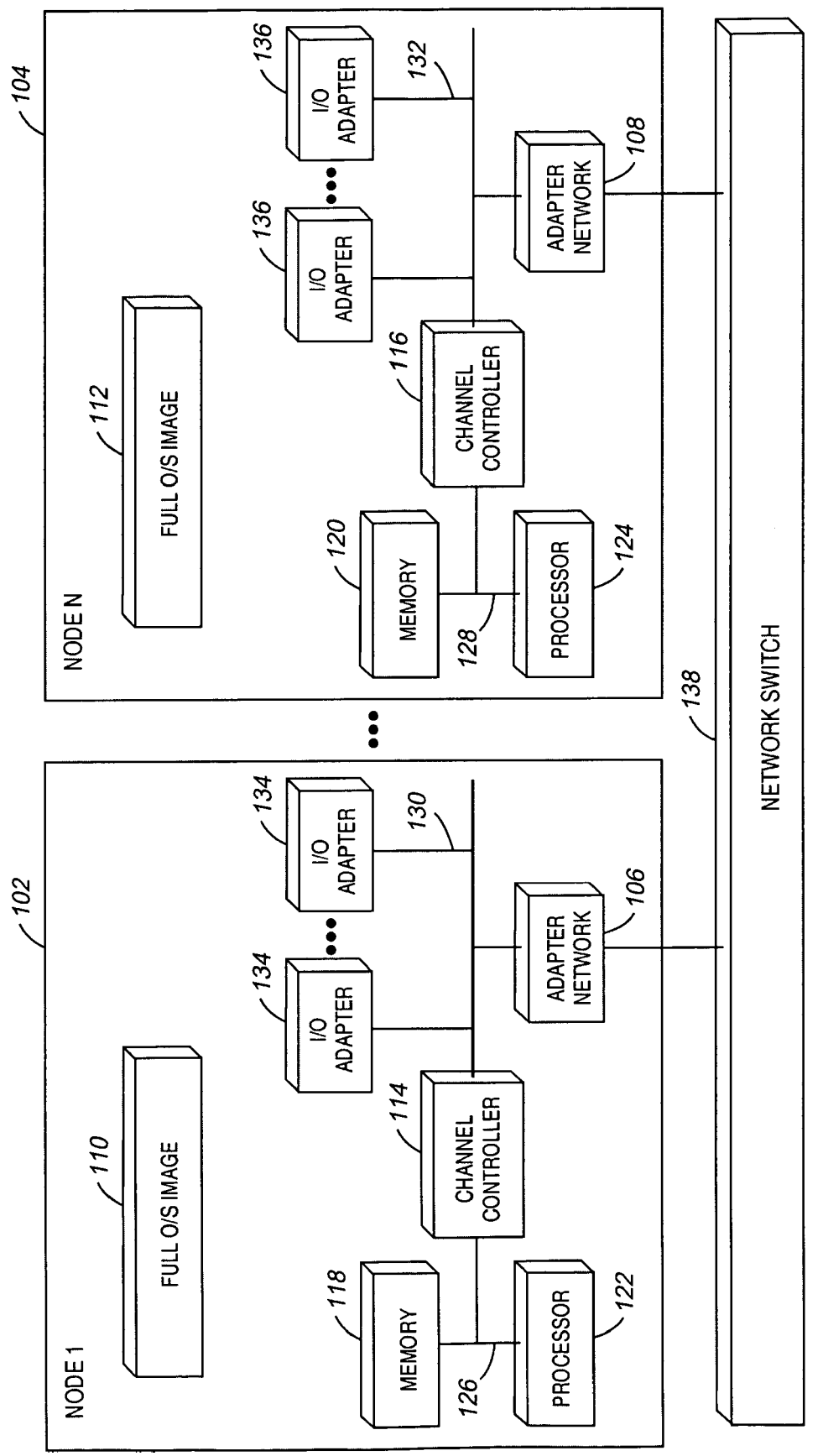
FIG. 1 is a block diagram of a highly parallel-distributed multiprocessor computing environment, according to an embodiment of the present invention.

According to an embodiment of the present invention, as shown in FIG. 1, an exemplary distributed computing environment 100 is shown. In one embodiment, the distributed computing environment is a SMP computing environment. The distributed computing environment 100 includes a plurality of nodes 102, 104 coupled to one another node via a plurality of network adapters 106, 108. Each node 102, 104 is an independent computer with its own operating system image 110, 112, channel controller 114, 116, memory 118, 120, and processor(s) 122, 124 on a system memory bus 126, 128, a system input/output bus 130, 132 couples I/O adapters 134, 136 and network adapter 106, 108. Although only one processor 122, 124 is shown in each processing node 102, 104, each processing node 102, 104 is capable of having more than one processor. Each network adapter is linked together via a network switch 138. All or some of the processing nodes 102, 104 can include different types of computers and/or different based operating systems 110, 112. All of these variations are considered a part of the claimed invention.

Exemplary Component Hierarchy for Processors in a Multi-Computer System

Figure 2:
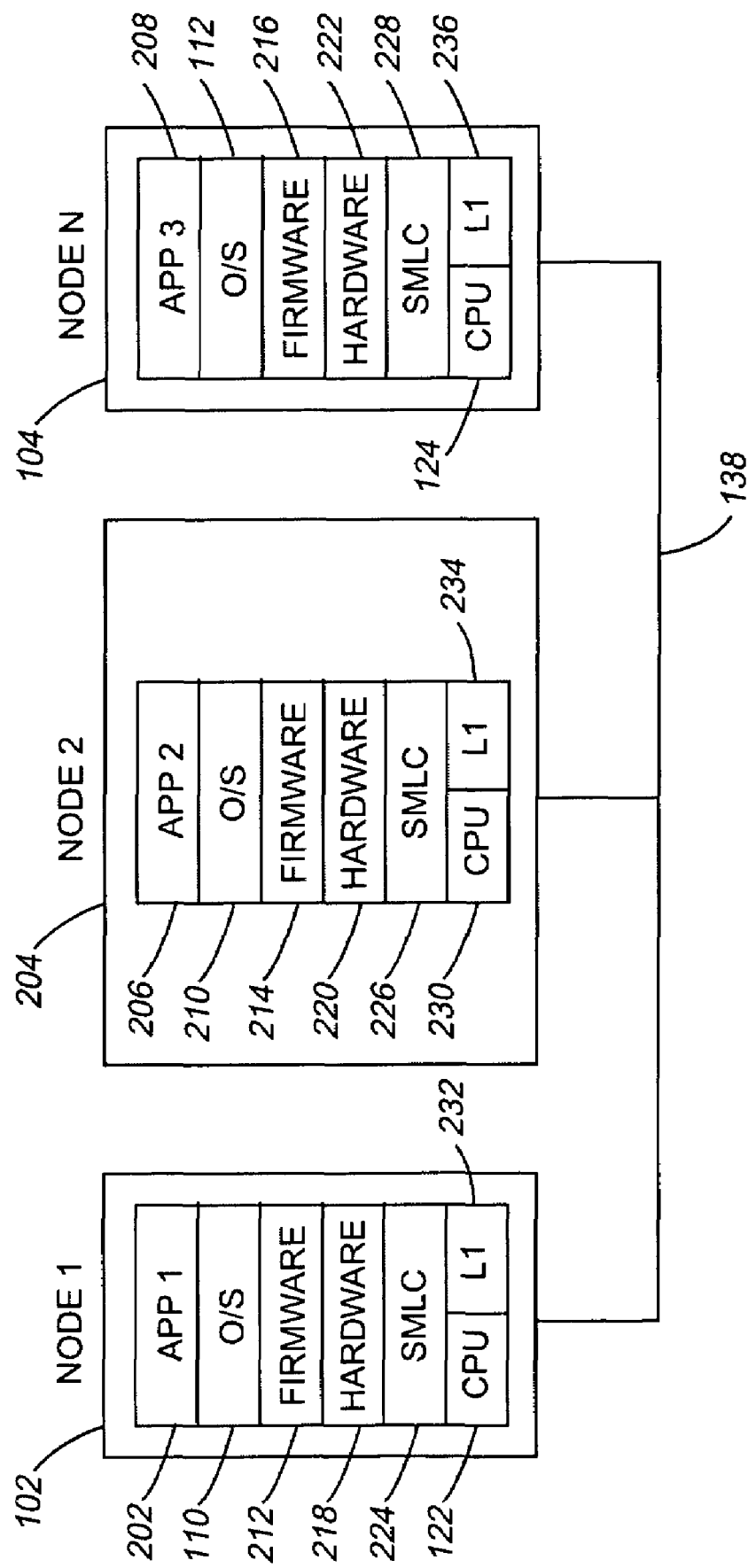
FIG. 2 is a block diagram of an exemplary component hierarchy of each processing node in the multiprocessor computing environment of FIG. 1, according to the present invention.

FIG. 2 is a block diagram illustrating an expanded view 200 of a number of processing nodes 102, 104 of the distributed computing environment 100 of FIG. 2, according to the present invention. In one embodiment, one or more application programs APP1 202, APP2 206, APP3 208 are running on the respective processor 122, 230, 124 of each processing node 102, 204, and 104. In another embodiment, the application programs APP1 202, APP2 206, APP3 208 are distributed and running on more than one processor either within the respective processing node 102, 204, 104 or across the processing nodes 102, 204, 104. An application program interface ("API") can be used to interface the applications 202, 206, 208 with other processing nodes on the network switch 138 where the applications 202, 206, 208 currently reside.

Each processing node 102, 204, 104 includes an operating system 110, 210, 112, that is running, for example, on each respective processor 122, 230, 124. The operating system 110, 210, 104 provides, among other things, a software platform on top of which the applications APP1 202, APP2 206, APP3 208 run. Each processing node 102, 204, 104 also includes firmware 212, 214, 216, which provides instructions for how the respective processor 122, 230, 124 communicates with other hardware components. The hardware 218, 220, 220 of each processing node 102, 204, 104 includes at least one small mirrored lock cache 224, 226, 228 and a processor 122, 230, 124. Each small mirrored lock cache 224, 226, 228 are mirror copies of each other. The small mirrored lock cache ("SMLC") 224, 226, 228 will be discussed in greater detail below. Traditional caches such as Level 1 cache 232, 234, 236 are also included within the hardware 218, 220, 222 of each processing node 102, 204, and 104.

Exemplary Small Mirrored Lock Cache

Figure 3:
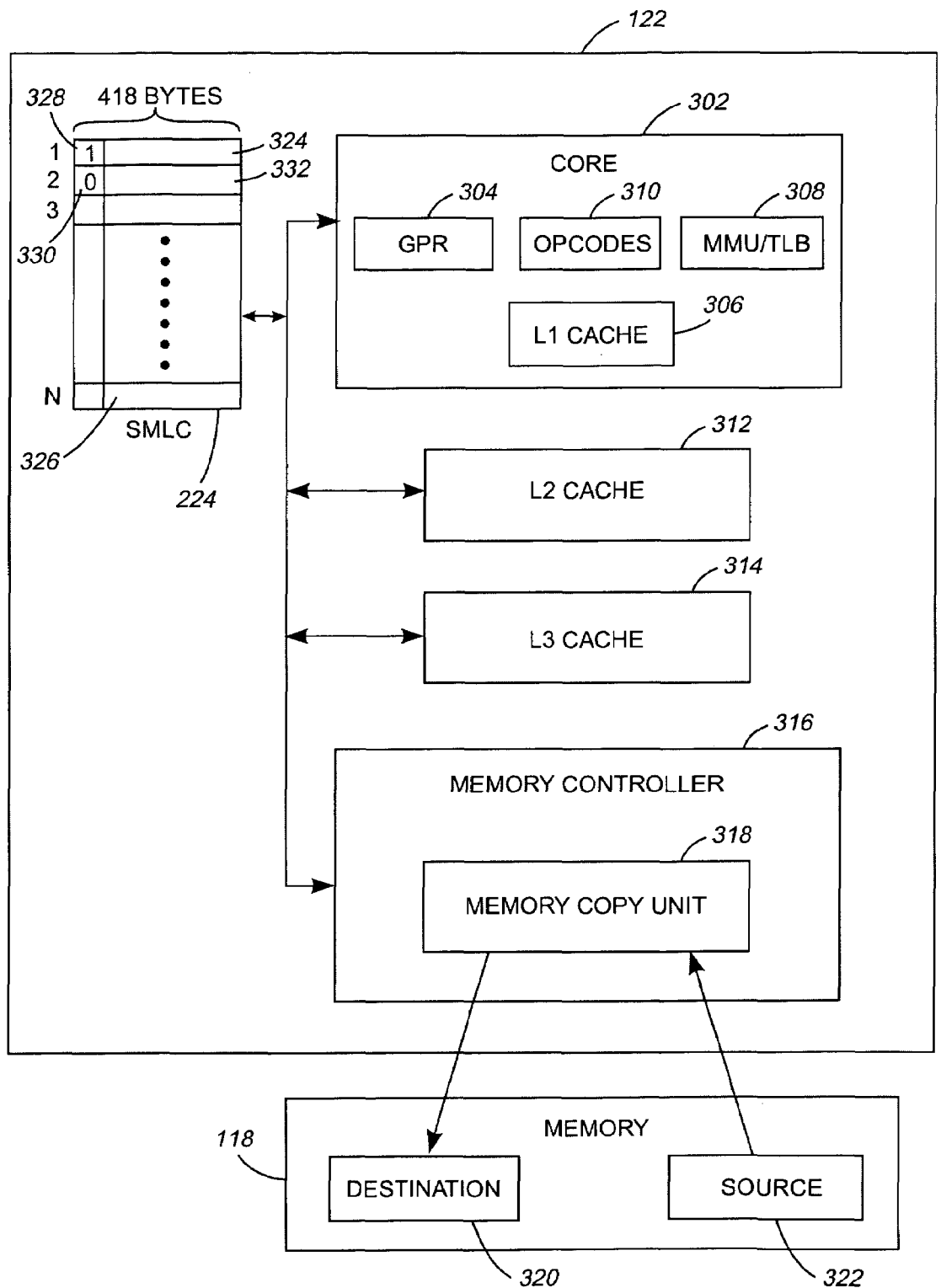
FIG. 3 is a block diagram illustrating a more simplified version of a processor as shown in FIG. 1, according to the present invention.

FIG. 3 is a block diagram illustrating a more simplified view of the processor 122 in FIG. 1 including a small mirrored lock cache 224 according to an embodiment of the present invention. FIG. 3 shows a processor core 302 including a general purpose register ("GPR") 304; a Level 1 cache 306, and a memory management unit 308, which includes a translation lookaside buffer ("TLB"). The GPR 304, for example, store fixed-point and integer values accessed and produced by fixed-point units and load-store units. The MMU/TLB 308 includes various components for handling memory accesses requested by the processor 122. For example, the TLB component of the MMU 308 includes parts of a page table (also included in the MMU 308) for translating virtual addresses into real addresses. The MMU/TLB 308 also includes components for memory protection and cache control. The processor 122 also includes opcodes 310 such as a memory copy instruction.

A Level 2 cache 312 and a Level 3 cache 314 are coupled to the processor core 302. A memory controller 316 is also coupled to the process core 122.

The processor 122 also includes at least one small mirrored lock cache 224. Small mirrored lock caches are separate from the L1 306, L2 312, and L3 314 caches and are mirror copies of one another. In other words, at any given point in time, small mirrored lock caches on the same processor or across different processors in a multi-processor computing environment will have the same data. For example, a write by a processor into its SMLC is automatically propagated to other SMLCs in a SMP computing environment. Small mirrored lock caches can be either primary local lock caches for use by a local processing node (Process id) and in another embodiment global lock caches, that is, any processor has an equal chance of acquiring a lock within the small mirrored lock cache. Global lock caches are highly contended caches.

The width of a SMLC, in one embodiment, is as small as 4/8 bytes to hold the entire lock structure. If data is bigger than what the lock can hold, it is placed in the memory 118. The width of a SMLC is smaller and includes fewer entries than a traditional data cache. The hardware 218 of the processor 122 provides the mirroring capability via connections (not shown) between the small mirrored lock caches within the processor 122 and the other processors 204, 104 in the multi-processor computing environment.

The SMLC 224 includes cache entry1 324 through cache entryN 326. The number of cache entries, in one embodiment, is sufficient to hold a working set. A working set, in one embodiment, is the number of locks that are needed to run a system at a given set of time. The size of a working set increases or decreases depending on the current system environment, e.g. what processes are currently running. In one embodiment, if the size of the working set is larger than what the SMLC 224 can accept, a traditional cache is used. and therefore the number of cache entries is a function of the number of processors in the processing node. A flag or availability bit is included with each cache entry to identify if the lock is available. For example, the availability bit 328 for the cache entry1/lock1 324 is set to 1, signifying that the lock is currently unavailable. The availability bit 330 for cache entry2/lock2 332 is set to 0 signifying that the lock is available. When a processor tries to acquire a particular lock, the processor looks at the availability bit to determine if the lock is available.

The SMLC 224 bypasses the traditional lock hierarchy. Mapping bits are included in the page table (not shown) in the MMU 308 to signal that particular entries are to be kept in the SMLC 224. The application 202, OS 110, and/or middleware submit an instruction to the system to signal that a specific lock needs to be placed in the SMLC 224 (if space is available). This process is transparent to the end user. Aliasing is not allowed for a particular lock word to be used in both the SMLC 224 and a traditional cache such as the L1 306, L2 312, and L3 314 caches. Mapping is allowed either to the SMLC 224 or a traditional cache, but not both. In one embodiment, the processing node 102 views the SMLC 224 as a special sideband cache In other words, the L2 312 or L3 314 caches do not backup the SMLC 223. The values in the SMLC 224 are reflected only in the memory 118. and not the L2 312 or L3 314 cache.

In one embodiment, SMLC managing mechanisms (not shown) are implemented within the OS 110 or hardware 218. For example, a least recently ("LRU") based mechanism is implemented for moving a lock from the SMLC 224 to a traditional cache when a new allocation in the SMLC 224 is requested and there is insufficient space. In an alternative embodiment, the OS 110 includes various policies for how the SMLC 224 lock caches are allocated to the various applications 202 the OS 110 itself, and middleware. These policies can be customized according to the type of OS 110, applications 202 and middleware present in the processing node 102.

Race conditions for the SMLC 224 are avoided, in one embodiment, by automatically updating the lock word. For example, in an SMP environment, shared variables need to be accessible to all processors in the SMP environment. Multiple processors may try to access the same lock at the same time resulting in "hot spotting" of locks. For example, each processor may try to set a lock bit to zero and then write to the lock believe that they have acquired the lock. By automatically updating the lock word when a processor acquires a lock, other processors are notified that the lock is unavailable. The lock word is then automatically updated when a processor releases lock, thereby signaling other processors that the lock is available. The lock word, in one embodiment, is automatically updated by using "test and set" and "reset" operations.

In another embodiment, race conditions are avoided by utilizing time stamps. For example, when a processor requests access to a lock, a time stamp is also sent with the request or is included within the request. The processor ID associated with the earliest time stamp is stored in the lock. When a processor tries to access the lock it checks the processor ID against its own ID and if they match the processor is able to acquire the lock. If the IDs do not match, the processor is not able to acquire the lock.

For lock operations of "clear all" and "set all", connections are setup to send these signals via a single bit so to economize the cache interconnect bandwidth. In other words, instead of sending the entire lock word to all caches in the SMLC, only a bit (set/clear) is sent along with the address of the lock word. In one embodiment, the SMLC 224 is strongly ordered, i.e. ordering stores to the SMLC 224, so that race conditions are avoided. Additionally. ordering the stores to the SMLC 224 also keeps the SMLC logic simple and very efficient It should be noted that the SMLC 224 is not limited to being strongly ordered.

An application 202, the OS 110, and middleware can use an unlimited number of locks in the SMLC 224. Similar to traditional locks, the most active lock words the SMLC 224 are kept in the in the SMLC 224 for fast acquire and release. The remaining lock words are kept in traditional caches such as L1 306, L2 312, and L3 314 or in memory 118 with the above restriction that aliasing is not allowed between the SMLC 224 and traditional caches.

Small mirrored lock caches also ensure that synchronization between processes occurs efficiently. For example, in an SMP computing environment, parallel applications can have several tasks (processes) that execute on the various processors on the same processing node. Typically, a process (or task of the parallel job) is mapped to a processor on the processing node. Not all the processes will be completed at the same time and must be synchronized before continuing. These tasks commonly execute a barrier synchronization operation so that the threads can be synchronized. The processes exchange messages via shared memory or by using atomic operations which are usually very slow. When an SMLC 224 is utilized in a system, whenever a value is written in a cache entry, the data is automatically mirrored to the other caches. Therefore, processors do not have to examine each entry in the SMLC cache 224 to determine if a process has completed.

Small mirrored lock caches also allow for control messages to be efficiently sent from processor to processor. A control message, for example, is a message for synchronization of TOD clocks on all of the processors, a barrier synchronization message as discussed above, or the like. In one embodiment, short messages are used as control messages, e.g. to determine if longer messages are handled correctly. For example, short messages are used, in one embodiment, to logically control something else, e.g. status of longer message such as was a message sent, was there an error in the message, and the like. When interacting with control messages, the SMLC 224 will include messages instead of locks. For example, entry1 324 through entry N 326 will include control messages. The SMLC 224 can also act as a various synchronous register. For example, each processor in a multi-processor system has an assigned physical location in the SMLC 224. Each processor reads to see if every other processor has reached a certain step in a sequence, e.g. step 5. In this example, each processor must reach step 5 before the processors can continue to step 6. When each processor completes step 5, the SMLC 224 mirrors the information to each of the other processors, thereby ensuing efficient synchronization between the processors. Utilizing the SMLC 224 to notify each of the processors when other processor have completed a step in a sequence of steps is faster then exchanging messages via shared memory because the SMLC 224 is closer to the processor core 302.

One advantage of the present invention is that each processor does not have to check the memory 118 to see if a notification exists that indicates that a process is completed, instead short messages that signal each processor that processes running on other processors have been completed are able to be transmitted using the SMLC 224. For example, processor A sends a short message through the SMLC 224 to processor B. Processor A writes a full bit into its associated lock and processor B clears the bit when processor B reads the data in the lock. Processor A continues to write to the lock when it determines that the bit is set to zero. Using the SMLC 224 to transmit short messages instead of the having each processor check the memory is faster because the SMLC 224 is closer to the processor core 302.

In another embodiment, adapters also utilize the SMLC 224 to send control messages to processors, thereby avoiding the usual cache-miss latencies. For example, in order for the processes executing on the processors to be made aware that a DMA operation has occurred, the processes typically have to invalidate their cache entries (for DMA operations that are not cache-coherent) before reading memory locations that were changed as a result of the DMA operations. This causes inefficiency in processing data that is incoming via DMA operations (which is the typical method for most message passing parallel and distributed systems). The DMA operations from high performance network adapters can recognize that certain updates are reflected directly in the SMLC 224. For performance critical latency operations, this hardware assist makes the task of detecting new incoming data by the processes more efficient.

Exemplary Process of Mirroring Data Using a Small Mirrored Lock Cache

Figure 4:
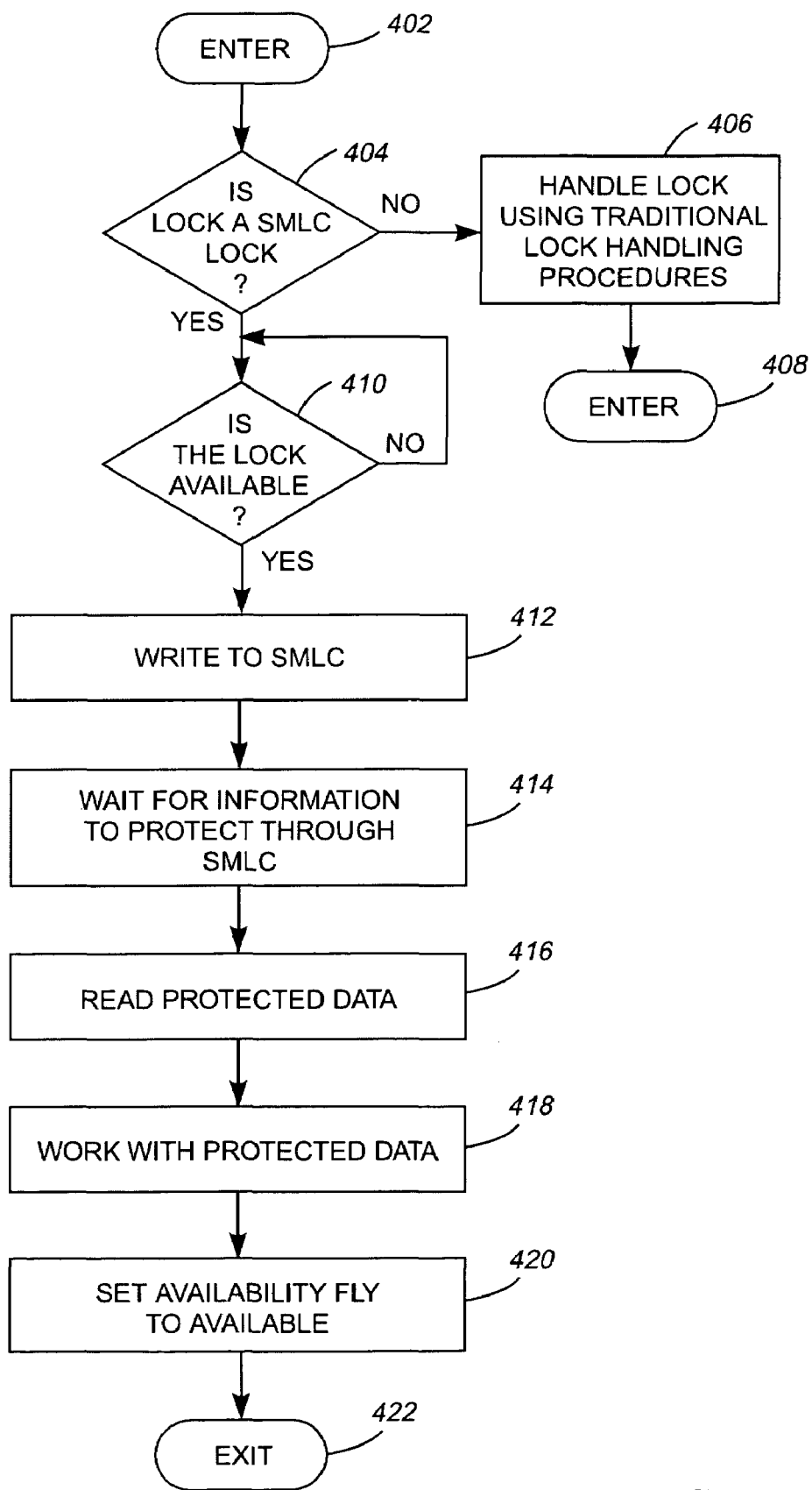
FIG. 4 is an operational flow diagram illustrating an exemplary process of replicating data using small mirror lock caches, according to the present invention.

FIG. 4 is an operational flow diagram illustrating a process of acquiring a small mirrored lock cache and propagating its data to other small mirrored lock caches. The operational flow diagram of FIG. 4 begins at step 402 and flows directly to step 404. The processor 122, at step 404 determines if the lock it wants to acquire is an SMLC lock. If the result of this determination is negative, the lock is handled, at step 406, using traditional lock handling procedures. The control flow then exits at step 408. If the result of this determination is positive, the processor 122, at step 410, determines if the SMLC lock is available. In other words, the processor 122 determines if the lock is currently acquired by another processor. When a lock is available, the lock is automatically coherent. For example, to obtain valid execution results in a SMP computing environment, it is important to maintain a coherent memory hierarchy. The SMLC 224 provides a single view of the contents of memory to all of the processors. The processor 122 determines if the lock is available or unavailable, for example, by checking the availability bit 328, 330. If the result of this determination is negative, the processor 122 continues to check if the lock is available. If the result of this determination is positive, the processor 122, at step 412 writes to the SMLC 224 (which changes the availability flag to unavailable). For example, the processor 122 writes data to the acquired lock.

The processor 122, at step 416, reads the protected in the acquired lock and, at step 418, works with the protected data. Once the processor 122 is finished reading and working with the data, the processor 122, at step 420, sets the availability flag 328, 330 to available. For example, the processor performs a reset operation which changes the availability flag 328, 330 to available. The control flow then exits at step 422.

Exemplary Process of Preventing Aliasing Between Traditional Caches and SMLCs

Figure 5:
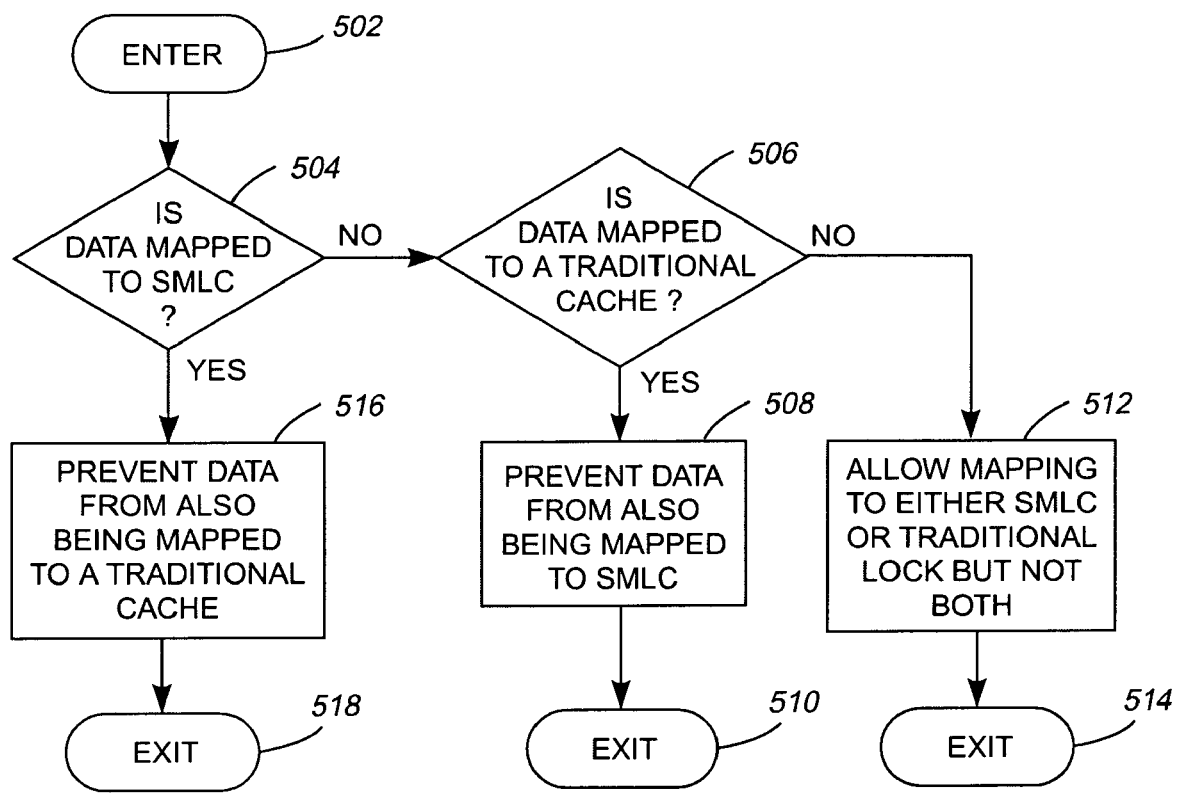
FIG. 5 is an operational flow diagram illustrating an exemplary process of preventing data from being mapped to both a small mirrored locked cache and a traditional cache, according to the present invention.

FIG. 5 is an operational flow diagram illustrating an exemplary process of preventing aliasing between traditional caches such as L1 306, L2 312, and L3 314 and the SMLC 224. The exemplary process of FIG. 5, in one embodiment, is performed by the OS 110. The operational flow diagram of FIG. 5 begins at step 502 and flows directly to step 405. The OS 110 determines, at step 504, if a lock word is mapped to the small mirrored lock cache 224. If the result of this determination is negative, the OS 110 determines, at step 506, if the lock word is mapped to a traditional cache. If the result of this determination is positive, the OS 110, at step 508, prevents the lock word from also being mapped to the SMLC 224. The control flow then exits at step 510. If the result of this determination is negative, the OS 110, at step 512, allows the lock word to be mapped to either the SMLC 224 or a traditional cache, but not both. The control flow then exits at step 514. If the result of step 504 is positive, the OS 110, at step 516, prevents the lock word from also being mapped to a traditional cache. The control flow then exits at step 518.

Exemplary Process of Utilizing Time Stamps to Avoid Race Conditions

Figure 6:
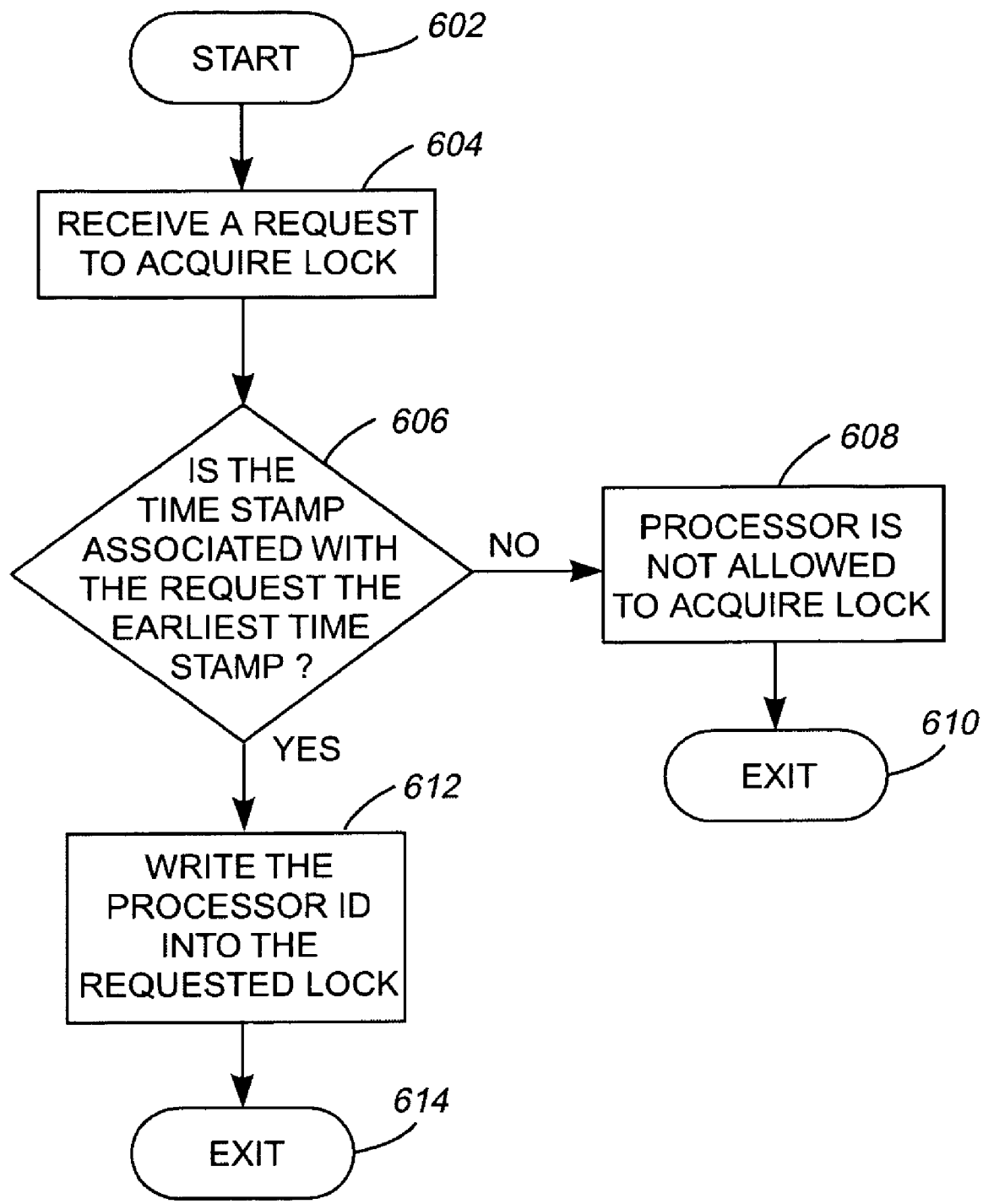
FIG. 6 is an operational flow diagram illustrating a process of avoiding race conditions by utilizing time stamps from the perspective of the SMLC, according to the present invention.

FIG. 6 is an operational flow diagram illustrating a process of avoiding race conditions by utilizing time stamps from the perspective of the SMLC 224. The operational flow diagram of FIG. 6 begins at step 602 and flows directly to step 604. The SMLC 224, at step 604, receives a request to acquire a lock. The SMLC 224, at step 606, determines whether the time stamp associated with the request is the earliest time stamp associated with a request for that particular lock. If the result of this determination is negative, the requesting processor, at step 608, is not granted access to the lock. The control flow then exits at step 610. If the result of this determination is positive, the processor ID associated with the requesting processor, at step 612, is written to the requested lock. This allows the requesting processor and only the requesting processor to acquire the lock. The control flow then exits at step 614.

Another Exemplary Process of Utilizing Time Stamps to Avoid Race Conditions

Figure 7:
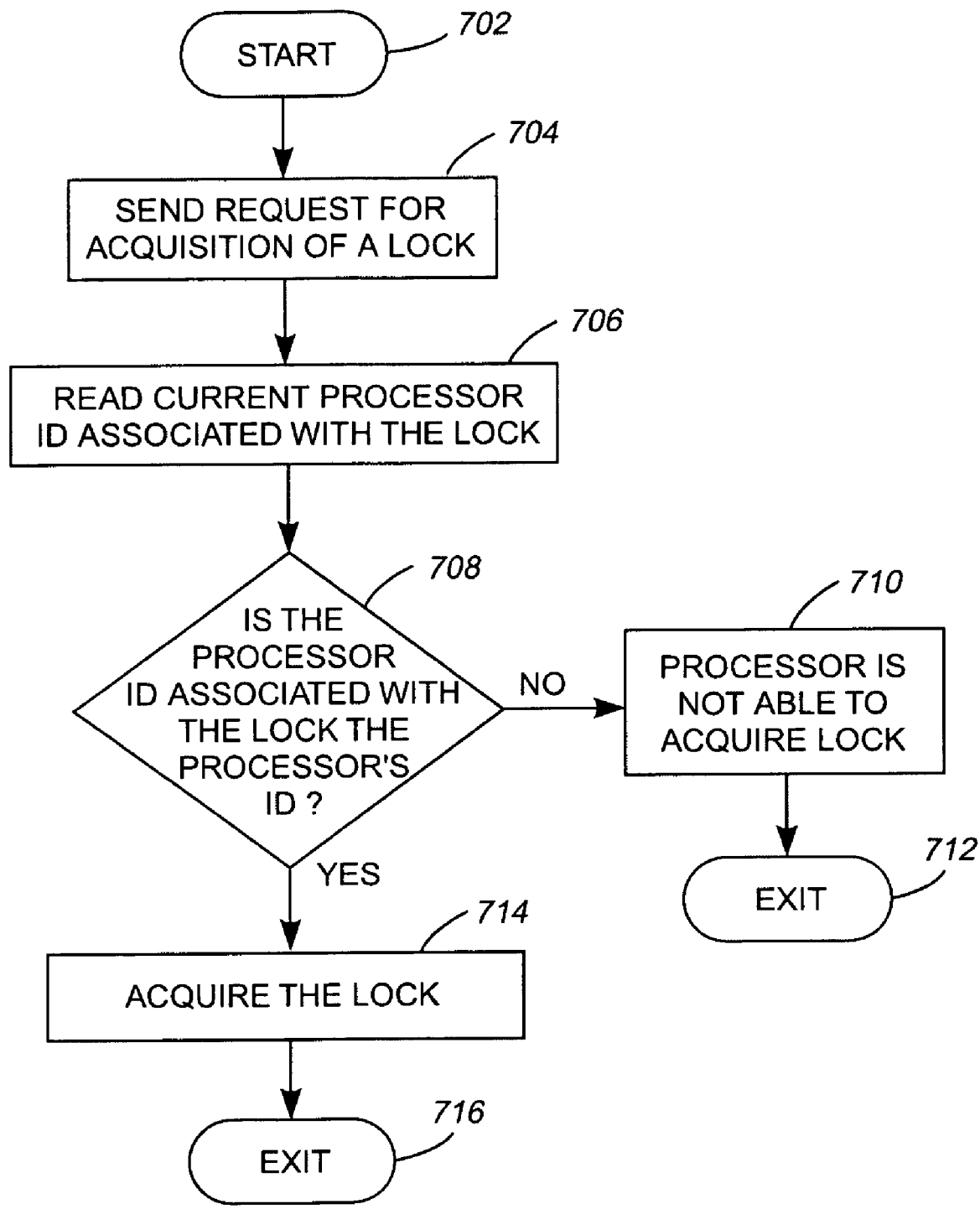
FIG. 7 is an operational flow diagram illustrating another process of avoiding race conditions by utilizing time stamps from the perspective of a requesting processor, according to the present invention.

FIG. 7 is an operational flow diagram illustrating another process of avoiding race conditions by utilizing time stamps from the perspective of a requesting processor. The operational flow diagram of FIG. 7 begins at step 702 and flows directly to step 704. The processor 122, at step 704, requests acquisition of a lock in the SMLC 224. The processor 122, at step 706, reads the processor ID that has been written into the requested lock based on the processor associated with the earliest time stamp. The processor 122, at step 708 determines if the processor ID written into the lock matches its processor ID. If the result of this determination is negative, the processor 122, at step 710, is not granted access to the lock. The control flow then exits at step 712. If the result of this determination is positive, the processor 122, at step 714, acquires the lock. The control flow then exits at step 716.

Non-Limiting Examples

The embodiments of the present invention are advantageous because they provide an efficient locking of data. Another advantage of the present invention is that the small mirrored lock caches are mirror copies of each other. This allows for the data of one small mirrored lock cache to reside locally at another small mirrored lock cache. A processing needing access to data at another location does not have to search for the data or retrieve it from another location.

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, on a mirrored lock cache, for propagating data to other mirrored lock caches, the method comprising:

coupling a first mirrored lock cache associated with a first processing node to a bus communicatively coupled to at least a second mirrored lock cache associated with a second processing node in a multi-processing system, wherein the first mirrored lock cache and the at least second mirrored lock cache are communicatively coupled to a non-cache memory within the multi-processing system, wherein the first mirrored lock cache and the at least second mirrored lock cache are physical memories that are separate and distinct from each other and from the non-cache memory, wherein a width of the first mirrored lock cache and the at least second mirrored lock cache is smaller than a non-mirrored lock cache within the multi-processing system, wherein the first mirrored lock cache and the at least second mirrored lock cache each comprise less cache entries than the non-mirrored lock cache, and wherein a number of the cache entries in the first mirrored lock cache and the at least second mirrored lock cache is a function of a number of processors in the multi-processing system;

analyzing a page table in a memory management unit comprising mapping bits associated with the first mirrored lock cache to identify a particular set of entries that are to be kept within the first mirrored lock cache;

preventing the data residing in the first mirrored lock cache and the at least second mirrored lock cache from being mapped into the non-mirrored lock cache;

setting an availability flag for indicating the availability of a lock residing in the first mirrored lock cache that is associated with the availability flag;

receiving a request from a processor to acquire a lock residing in the first mirrored lock cache, the request including at least a time stamp and a processor ID associated with the processor;

determining whether the time stamp precedes other time stamps associated with other requests from other processors;

writing the processor ID into the lock in response to the time stamp preceding the other time stamps associated with the other requests from the other processors;

granting the processor access to the lock only if the processor ID associated with the processor matches the processor ID written into the lock;

atomically updating by the first mirrored lock cache, in response to the processor being granted access to the lock, a lock word associated with the lock;

automatically mirroring, by the first mirrored lock cache, the lock word to the at least second mirrored lock cache independent of a processor of the multi-processing system so that the lock word which has been updated is reflected within the at least second mirrored lock cache;

receiving, by the first mirrored lock cache, data from a processing node;

mirroring, by the first mirrored lock cache, the data automatically, in response to receiving the data, to the at least second mirrored lock cache independent of a processor of the multi-processing system so that identical data is available locally at the at least second mirrored lock cache for use by the second processing node;

receiving a new allocation request associated with at least the first mirrored lock cache;

determining, in response to receiving the new allocation request, that the first mirrored lock cache comprises insufficient space for a new allocation of data associated with the new allocation request;

moving at least one lock currently residing within the first mirrored lock cache to the non-mirrored lock cache; and granting the new allocation request in response to moving the at least one lock to the non- mirrored lock cache.

* * * * *